UNITED STATES PATENT OFFICE.

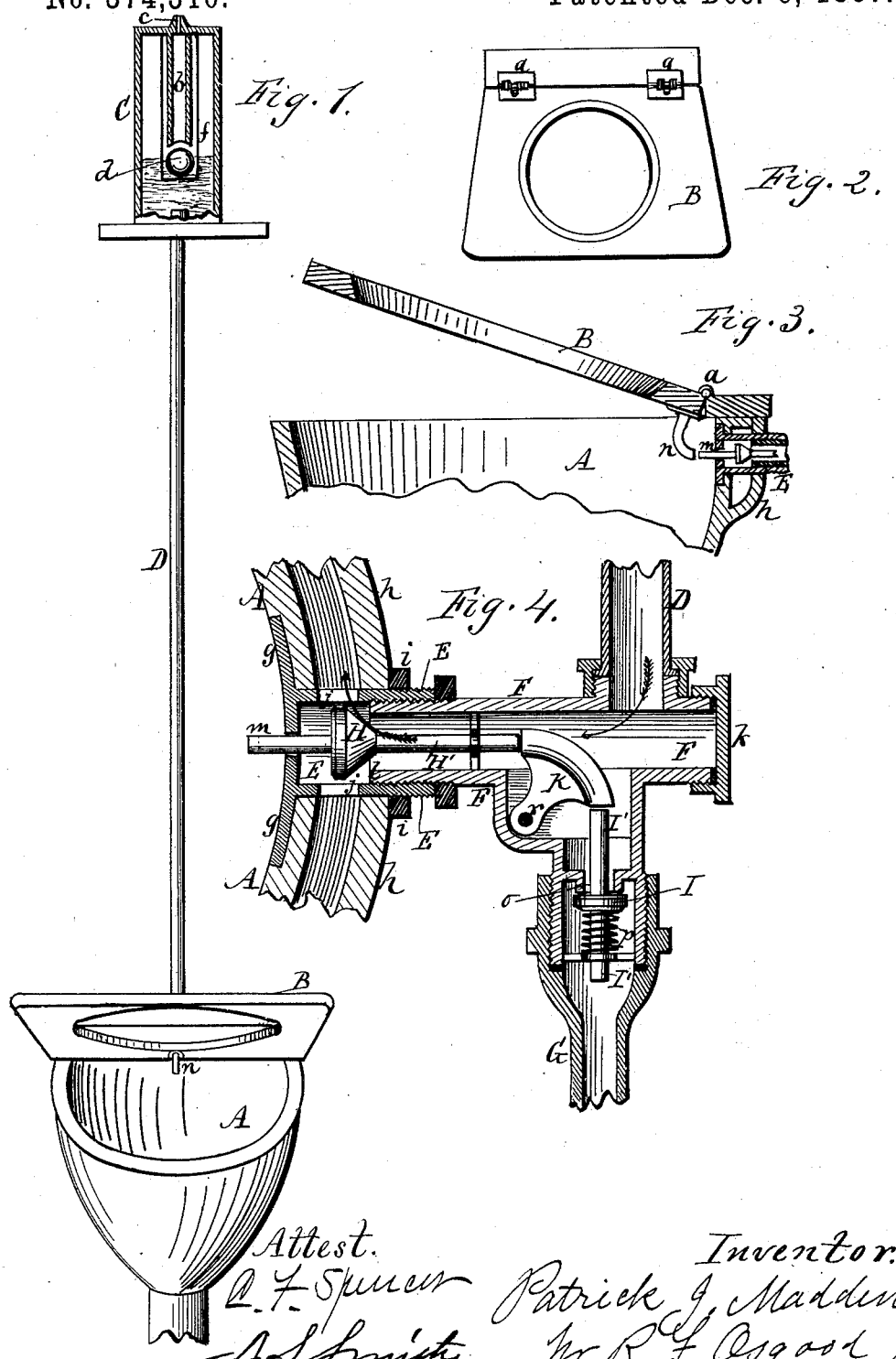

PATRICK J. MADDEN, OF ROCHESTER, NEW YORK.

FLUSHING ATTACHMENT FOR WATER-CLOSETS.

SPECIFICATION forming part of Letters Patent No. 374,310, dated December 6, 1887.

Application filed October 27, 1886. Serial No. 217,297. (No model.)

*To all whom it may concern:*

Be it known that I, PATRICK J. MADDEN, of the city of Rochester, in the county of Monroe and State of New York, have invented a certain new and useful Improvement in Flushing Attachments for Water-Closets; and I do hereby declare that the following is a full, clear, and exact description of the same, reference being had to the drawings accompanying this application.

My improvement relates to that class of water-closets in which the flushing-tank is located at a higher level than the closet-bowl and flushes the bowl by the fall of water after the weight is removed from the seat.

The invention consists of the following construction and arrangement.

In the drawings, Figure 1 is a front elevation of the device, the water-tank at the top being shown in section. Fig. 2 is a plan of the seat. Fig. 3 is an enlarged vertical cross-section of the seat, the top of the bowl, and connections. Fig. 4 is an enlarged longitudinal section of the valve arrangement.

A is the closet-bowl, and B is the seat. The seat is attached by spring-hinges $a$ $a$, so as to be automatically thrown up at an angle when not in use. The springs are coiled torsion-springs, as shown in Fig. 2.

C is the flushing-tank, located at a higher level than the bowl, and connected with the bowl by a pipe, D. The tank may be of any desired shape and of such size as to hold the requisite amount of water to flush the bowl, with extra air-space above. The tank is provided with a tube, $b$, forming a leg extending down from the top a suitable distance.

$c$ is a vent through the top of the tank above the tube.

$d$ is a rubber or other float below the tube and resting in a cage, $f$, by which it is held in position. The object of the tube is to allow a free and unimpeded flow of water upward into the tank at the start, and then, when the float is raised in contact with the end of the tube, to cut off the escape of air through the vent and cause the water as it rises farther in the tank to compress the air above. In other tanks of the kind no tube is used, so far as I am aware, but the air begins to compress as soon as the water enters, and the water is resisted during the whole filling of the tank. In my invention there is no resistance till the tank is partially filled.

E is a coupling-tube attached to the bowl. It has a flange, $g$, that rests in a seat in the interior of the bowl. The coupling extends through the hollow flushing-rim $h$ of the bowl, and is secured in place by a jam-nut, $i$, that screws up against the rim. The coupling is also provided with ports or passages $j$ $j$, that open into the hollow of the rim, as shown in Fig. 4. The water that passes through the ports enters the rim, and is discharged from thence into the bowl in the usual way.

F is a barrel screwed into the end of the coupling-tube E.

G is the induction-pipe leading from the street-main, and D is the eduction-pipe leading to the tank C and opening through the bottom of the same. The pipe D can be attached to the barrel either at the side, as shown in Fig. 4, or at the end. When attached to one nozzle, the other one is covered by a screw-cap, $k$, as shown.

H is a valve resting in the coupling-tube E and attached to a valve-rod, H'. This valve strikes against a seat, $l$, to cut off the flow of water into the bowl. The inner end, $m$, of the valve-rod projects into the bowl, as shown, and is struck by a curved stem, $n$, on the under side of the hinged seat when the seat is depressed.

I is a valve resting in the mouth of the induction-pipe G and attached to a valve-rod, I'. This valve strikes against a seat, $o$, to cut off the ingress of water from the main. It is pressed up by a spiral spring, $p$.

K is a quadrant-shaped rocker, having a tongue pivoted at $r$ and resting between the inner ends of the two valve-rods, H' and I', and so arranged that when one rod is thrown to close its valve the other will also be thrown to open its valve.

The operation is as follows: When the seat is depressed, the curved stem $n$ strikes the stem $m$ of the valve-rod H' and closes the valve H against the seat $l$ and cuts off the flow of water to the bowl. At the same time the motion is transferred to the valve-rod I' through the rocker K, and the valve I is opened, admitting water into the barrel from the main.

This water will pass up pipe D into the flushing-tank C, compressing the air therein. When the weight is removed from the seat, the seat is thrown up automatically, relieving the valves. The spring p closes the valve I against its seat, cutting off the water from the main, and at the same time the valve H is opened, allowing the water from the flushing-tank to flow down pipe D and through the barrel into the hollow rim of the bowl, as before described. This water not only falls by its own weight, but is forced down by the compressed air.

Having described my invention, I claim—

1. In a flushing attachment for water-closets, the combination of the two valve-rods standing at right angles to each other and provided with valves that open and close in opposite directions, the spring that closes the induction-valve to its seat, and a quadrant-shaped rocker between the inner ends of the valve-rods, serving to transmit motion from one to the other, as specified.

2. In a flushing attachment for water-closets, the combination of the hinged spring-seat provided with a projecting stem on its under side, a valve-rod provided with a valve, and a stem which projects inside the bowl, so as to be struck by the stem of the seat when depressed, a quadrant-shaped rocker at the rear end of the valve-rod, and a second valve-rod resting against the rocker and provided with a valve which opens and closes in the opposite direction from the other, and a spring for forcing the second valve against its seat, as herein shown and described.

3. In a flushing attachment for water-closets, the combination, with the two valve-rods provided with valves that open and close in opposite directions to each other, and with the rocker resting between the rods, of the coupling-tube E, passing through the side of the bowl, provided at its inner end with a flange, $g$, having a hole that forms the bearing for the inner projecting stem, $m$, of the eduction valve-rod, as herein shown and described.

In witness whereof I have hereunto signed my name in the presence of two subscribing witnesses.

PATRICK J. MADDEN.

Witnesses:
R. F. OSGOOD,
P. A. COSTICH.